(12) United States Patent
Koga et al.

(10) Patent No.: US 11,243,761 B2
(45) Date of Patent: Feb. 8, 2022

(54) LINK MANAGEMENT DEVICE, LINK MANAGEMENT METHOD, AND COMPUTER READABLE MEDIUM

(71) Applicant: Mitsubishi Electric Corporation, Tokyo (JP)

(72) Inventors: Yoichiro Koga, Tokyo (JP); Keita Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/975,199

(22) PCT Filed: Mar. 8, 2018

(86) PCT No.: PCT/JP2018/008950
§ 371 (c)(1),
(2) Date: Aug. 24, 2020

(87) PCT Pub. No.: WO2019/171526
PCT Pub. Date: Sep. 12, 2019

(65) Prior Publication Data
US 2020/0409692 A1    Dec. 31, 2020

(51) Int. Cl.
*G06F 8/71* (2018.01)
*G06F 8/54* (2018.01)
(Continued)

(52) U.S. Cl.
CPC .................. *G06F 8/71* (2013.01); *G06F 8/54* (2013.01); *G06F 8/75* (2013.01); *H04L 51/046* (2013.01)

(58) Field of Classification Search
USPC ........................................................ 717/120
See application file for complete search history.

(56) References Cited

U.S. PATENT DOCUMENTS

2014/0366044 A1* 12/2014 Neeman .................. G06F 9/451
 719/318
2018/0314569 A1* 11/2018 Neeman .................... G06F 8/71

FOREIGN PATENT DOCUMENTS

JP     H0520038 A      1/1993
JP     H05298077 A    11/1993
(Continued)

OTHER PUBLICATIONS

International Search Report (PCT/ISA/210) dated Jun. 12, 2018, by the Japan Patent Office as the International Searching Authority for International Application No. PCT/JP2018/008950.

(Continued)

*Primary Examiner* — John Q Chavis
(74) *Attorney, Agent, or Firm* — Buchanan Ingersoll & Rooney PC

(57) ABSTRACT

A link management device, concerning development management data utilized by each of a plurality of development management systems included in a tool chain system, manages a link between items of the development management data. A link registration unit executes crawling of acquiring, from each of the plurality of development management systems, information of the development management data including naming information indicating naming of the development management data. Then, based on the information of the development management data, the link registration unit transmits a link registration instruction for registering the link between the items of the development management data to the plurality of development management systems. Then, the link registration unit records the link between the items of the development management data, as link record information.

10 Claims, 13 Drawing Sheets

(51) Int. Cl.
*G06F 8/75* (2018.01)
*H04L 12/58* (2006.01)

(56) References Cited

FOREIGN PATENT DOCUMENTS

JP      H07282002 A    10/1995
JP     2016076181 A     5/2016

OTHER PUBLICATIONS

Written Opinion (PCT/ISA/237) dated Jun. 12, 2018, by the Japan Patent Office as the International Searching Authority for International Application No. PCT/JP2018/008950.

* cited by examiner

Fig. 4

163 : REGULATION INFORMATION

| | DATA TYPE | DATA INFORMATION STORAGE LOCATION | INFORMATION TO REFER TO | NAMING REGULATION |
|---|---|---|---|---|
| 401 | Issue | version management system | ticket name | [name] # {ticket number} |
| 402 | branch | version management system | branch name | {Issue number} - [name] |
| 403 | build | build management system | branch name | {Issue number} - [name] |
| 404 | test specification | test management system | ticket name | [name] # {ticket number} |

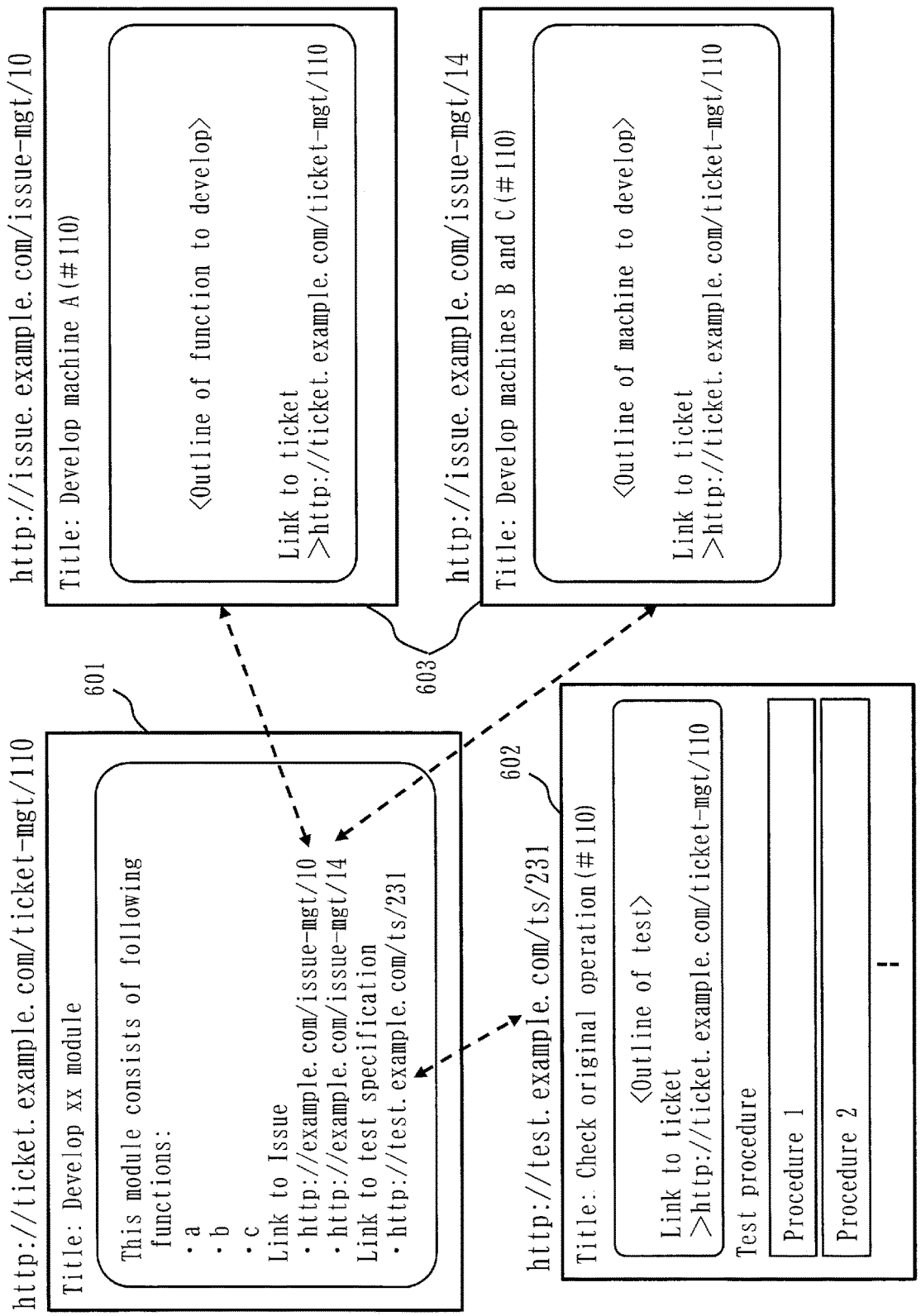

LINK MANAGEMENT DEVICE, LINK MANAGEMENT METHOD, AND COMPUTER READABLE MEDIUM

TECHNICAL FIELD

The present invention relates to a link management device, a link management method, and a link management program. Particularly, the present invention relates to a link management device, a link management method, and a link management program for coordinating items of development management data in a tool chain system.

BACKGROUND ART

As a development environment for software development, there is a tool chain system in which a plurality of development management systems are coordinated. The tool chain system is also simply called a tool chain. The tool chain system facilitates sharing of various items of development information. Meanwhile, in order to use a plurality of development management systems with different applications or user interfaces (UIs) in coordination with each other while properly synchronizing them, advanced knowledge on each development management system is required. For this reason, a problem exists that an organization that has introduced a tool chain system cannot always use the introduced tool chain system properly.

In order to coordinate a plurality of development management systems in a tool chain system, a device for coordinating the development management systems has been proposed which operates outside the tool chain system.

Patent Literature 1 discloses a device for monitoring events of development management systems in a tool chain system. Upon detecting a combination of events that match a condition specified in advance, this device transmits a message as a trigger for the development management systems to start operation.

CITATION LIST

Patent Literature

Patent Literature 1: JP 07-282002 A

SUMMARY OF INVENTION

Technical Problem

The technique disclosed in Patent Literature 1 realizes tool coordination by monitoring events of development management systems in the tool chain system and automatically controlling the start of operations of development management systems to operate in coordination with each other. However, the technique of Patent Literature 1 describes only a definition of a relation between an event generated by a development management system and an operation of another development management system to be coordinated with the former development management system. Therefore, a problem exists that coordination of items of development management data is insufficient.

Further, although the technique of Patent Literature 1 controls the coordination between the development management systems by using the occurrence of an event as a trigger, the technique cannot handle coordination of items of development management data already registered. This is also a problem.

A link management device according to the present invention has as its objective to automatically register a link between items of development management data which are related to each other.

Solution to Problem

A link management device according to the present invention which, concerning development management data utilized by each of a plurality of development management systems included in a tool chain system, manages a link between items of the development management data, the link management device comprising a link registration unit to execute crawling of acquiring, from each of the plurality of development management systems, information of the development management data including naming information indicating naming of the development management data, to transmit, based on the information of the development management data, a link registration instruction for registering the link between the items of the development management data to the plurality of development management systems, and to record the link between the items of the development management data, as link record information.

Advantageous Effects of Invention

In a link management device according to the present invention, a link registration unit executes crawling of acquiring, from each development management system, information of development management data, to obtain the information of the development management data including naming information of the development management data. Then, based on the information of the development management data, the link registration unit transmits a link registration instruction for registering a link between the items of the development management data to a plurality of development management systems, and records the links between the items of the development management data, as link record information. Hence, with the link management device according to the present invention, the link between related items of the development management data can be precisely registered automatically.

BRIEF DESCRIPTION OF DRAWINGS

FIG. 4 is a diagram illustrating an example of regulation information according to Embodiment 1.

FIG. 5 is a diagram illustrating an example of a link registration result according to Embodiment 1.

DESCRIPTION OF EMBODIMENTS

Figure 1:
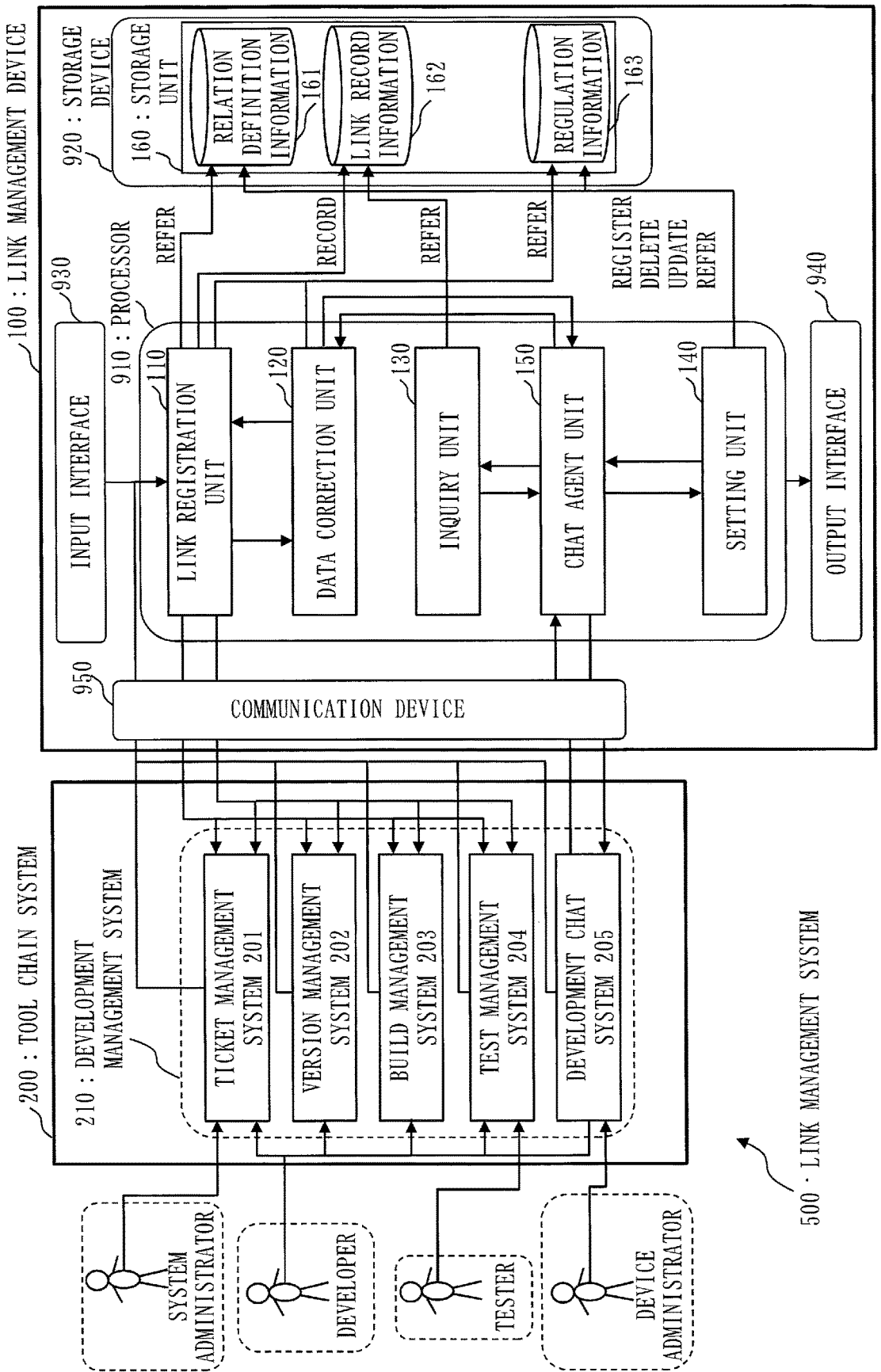
FIG. 1 is a configuration diagram of a link management system and a link management device according to Embodiment 1.

An embodiment of the present invention will be described with referring to drawings. In the drawings, the same or equivalent portion is denoted by the same reference sign. In the description of the embodiment, an explanation for the same or equivalent portion will be appropriately omitted or simplified.

Embodiment 1

*Description of Configuration*

Configurations of a link management system 500 and a link management device 100 according to the present embodiment will be described with referring to FIG. 1.

The link management system 500 according to the present embodiment is provided with the link management device 100 and a tool chain system 200 which is a target of link management by the link management device 100.

In the present embodiment, the tool chain system 200 is composed of development management systems 210 such as a ticket management system 201, a version management system 202, a build management system 203, a test management system 204, and a development chat system 205. These development management systems 210 are examples of a generally often-employed development management system. Each development management system 210 can be used as a World Wide Web (Web) application.

The link management device 100 according to the present embodiment, concerning development management data utilized by each of the plurality of development management systems 210 included in the tool chain system 200, manages a link between items of the development management data. For the ticket management system 201, a system administrator of the tool chain system 200 checks the development management data. For each of the plurality of development management systems 210, a developer checks, registers, updates, and cancels the development management data. For the test management system 204, a tester registers a test. For the development chat system 205, a device administrator of the link management device 100 sets a database of the link management device 100, and checks the setting.

The link management device 100 is a computer. The link management device 100 is provided with a processor 910 and also with other hardware devices such as a storage device 920, an input interface 930, an output interface 940, and a communication device 950. The storage device 920 is provided with a memory and an auxiliary storage device. The processor 910 is connected to the other hardware devices via signal lines and controls these other hardware devices.

The link management device 100 is provided with a link registration unit 110, a data correction unit 120, an inquiry unit 130, a setting unit 140, a chat agent unit 150, and a storage unit 160, as function elements. Relation definition information 161, link record information 162, and regulation information 163 are stored in the storage unit 160. The relation definition information 161, the link record information 162, and the regulation information 163 are also called a relation definition database, a link record database, and a regulation database, respectively.

Functions of the link registration unit 110, data correction unit 120, inquiry unit 130, setting unit 140, and chat agent unit 150 are implemented by software.

The storage unit 160 is provided to the storage device 920.

The processor 910 is a device that implements a link management program. The link management program is a program that implements the functions of the link registration unit 110, data correction unit 120, inquiry unit 130, setting unit 140, and chat agent unit 150.

The processor 910 is an Integrated Circuit (IC) which performs arithmetic processing. Specific examples of the processor 910 are a CPU, a Digital Signal Processor (DSP), and a Graphics Processing Unit (GPU).

The memory is a storage device which stores data temporarily. Specific examples of the memory are a Static Random-Access Memory ((SRAM) and a Dynamic Random-Access Memory (DRAM).

The auxiliary storage device is a storage device which stores data. A specific example of the auxiliary storage device is an HDD. Alternatively, the auxiliary storage device may be a portable storage medium such as an SD (registered trademark) memory card, a CF, a NAND flash, a flexible disk, an optical disk, a compact disk, a blu-ray (registered trademark) disk, and a DVD. Note that HDD stands for Hard Disk Drive, SD (registered trademark) stands for Secure Digital, CF stands for CompactFlash (registered trademark), and DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Area Network (LAN).

The output interface 940 is a port to be connected to a cable of an output device such as a display. The output interface 940 is specifically a USB terminal or a High Definition Multimedia Interface (HDMI; registered trademark) terminal. The display is specifically a Liquid Crystal Display (LCD).

The communication device 950 has a receiver and a transmitter. The communication device 950 is connected to a communication network such as a LAN, the Internet, and a telephone line by wire connection or wireless connection. The communication device 950 is specifically a communication chip or a Network Interface Card (NIC). The link management device 100 sends and receives a message to and from the tool chain system 200 via the communication device 950.

The link management program is read by the processor 910 and executed by the processor 910. Not only the ink management program but also an Operating System (OS) is stored in the memory. The processor 910 executes the link management program while executing the OS. The link management program and the OS may be stored in the auxiliary storage device. The link management program and the OS stored in the auxiliary storage device are loaded in the memory and executed by the processor 910. The link management program may be built in the OS partly or entirely.

The link management device 100 may be provided with a plurality of processors that substitute for the processor 910. The plurality of processors share execution of the link management program. Each processor is a device that executes the link management program as the processor 910 does.

Data, information, signal values, and variable values utilized, processed, or outputted by the link management program are stored in the memory, the auxiliary storage device, or a register or cache memory in the processor 910.

"Unit" in each of the link registration unit 110, the data correction unit 120, the inquiry unit 130, the setting unit 140, and the chat agent unit 150 may be replaced by "process", "procedure", or "stage".

The link management program causes the computer to execute processes, procedures, or stages corresponding to the above-mentioned link registration unit 110, data correction unit 120, inquiry unit 130, setting unit 140, and chat agent unit 150 with their "unit" being replaced by "process", "procedure", or "stage". A link management method is a method carried out by the link management device 100 through execution of the link management program.

The link management program may be stored in a computer readable recording medium and may be provided in the form of the recording medium. Alternatively, the link management program may be provided in the form of a program product.

\*\*\*Description of Function of Constituent Element\*\*\*

Functions of function elements provided to the link management device 100 will be described briefly.

Based on conditions registered in the relation definition information 161 and regulation information 163, the link registration unit 110 registers a link between items of development management data managed by each development management system 210, with the link record information 162. The link registration unit 110 executes crawling of acquiring, from each of the plurality of development management systems 210, information of the development management data including naming information indicating naming of the development management data. Based on the acquired information of the development management data, the link registration unit 110 transmits a link registration instruction 311 for registering the link between the items of the development management data to the plurality of development management systems. The link registration unit 110 also records the link between the items of the development management data, as the link record information 162.

Based on the relation definition information 161, the regulation information 163, and the information of the development management data, the link registration unit 110 determines whether there is an item of development management data that violates the relation definition information 161 or regulation information 163. The relation definition information 161 indicates a condition between the items of the development management data. The regulation information 163 includes a naming condition of the development management data. If there is an item of development management data that violates the relation definition information 161 or regulation information 163, the link registration unit 110 outputs a violation report 32.

Based on the violation report 32, the data correction unit 120 transmits a correction request message 34 for correcting the violating item of the development management data, to the tool chain system 200. The data correction unit 120 also receives a correction instruction message 35 including a correction instruction that corrects the violating item of the development management data. Then, the data correction unit 120 outputs a correction registration request 351 for registering the link to the corrected item of the development management data, to the link registration unit 110. Specifically, the data correction unit 120 refers to the link record information 162 and the regulation information 163 and notifies the developer, via the development chat system 205, of information of the regulation-violating item of the development management data. After that, the data correction unit 120 causes the link registration unit 110 to perform the correction received from the developer via the development chat system 205.

In response to the inquiry content 361 received from the developer via the development chat system 205, the inquiry unit 130 refers to the link record information 162 and replies to the developer with a response content 362 for the inquiry, via the development chat system 205.

The setting unit 140 receives an operation about setting from the device administrator of the link management device 100 via the development chat system 205, and performs update and reference of the setting to be registered with the relation definition information 161 and regulation information 163.

The chat agent unit 150 communicates with the development chat system 205 of the tool chain system 200 using a chat. The chat agent unit 150 receives a message for the link management device 100 from the development chat system 205 and sorts the received message. Also, the chat agent unit 150 generates a message for the developer using information from the data correction unit 120, inquiry unit 130, and setting unit 140, and transmits the generated message to the development chat system 205.

\*\*\*Description of Operations\*\*\* Link management process S100 by the link management device 100 according to the present embodiment includes link registration process S110, data correction process S120, inquiry process S130, and setting process S140.

<Link Registration Process S110>

Figure 2:
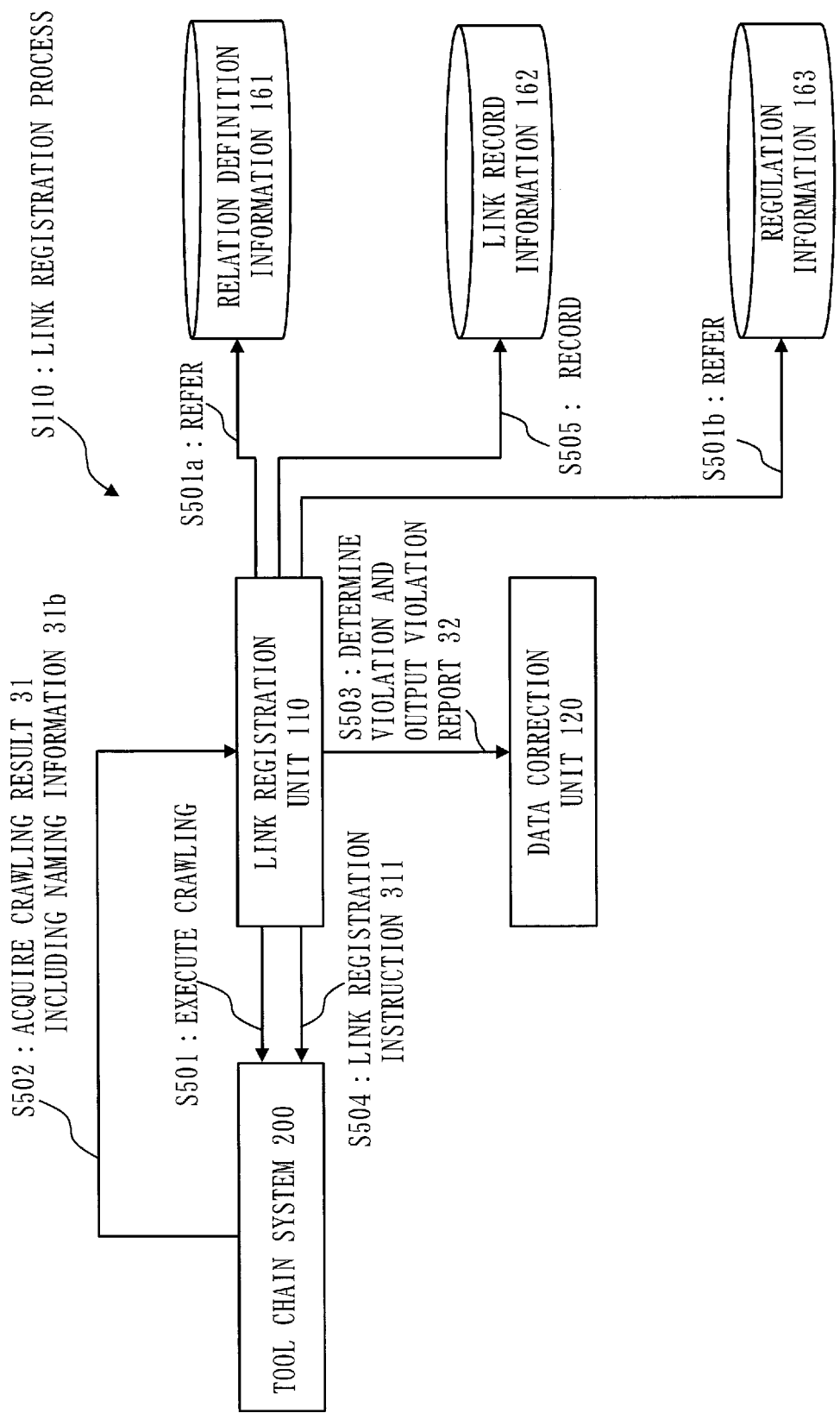
FIG. 2 is a diagram illustrating a link registration process according to Embodiment 1.

Link registration process S110 according to the present embodiment will be described with referring to FIG. 2.

In link registration process S110, the link registration unit 110 refers to the conditions registered in the relation definition information 161 and regulation information 163. Then, the link registration unit 110 registers the link between the items of the development management data.

In step S501, the link registration unit 110 performs crawling of the tool chain system 200 to acquire information of the development management data. The link registration unit 110 performs crawling regularly. The information of the development management data includes naming information 31b expressing naming of the development management data. The link registration unit 110 performs crawling of the tool chain system 200 while referring to the relation definition information 161 in step S501a and referring to the regulation information 163 in step S501b. Namely, the link registration unit 110 performs step S501, step S501a, and step S501b simultaneously.

In the present embodiment, crawling by the link management device 100 is to inquire the details of the development management data from each development management system 210 constituting the tool chain system 200, so as to obtain necessary information concerning the development management data.

Figure 3:
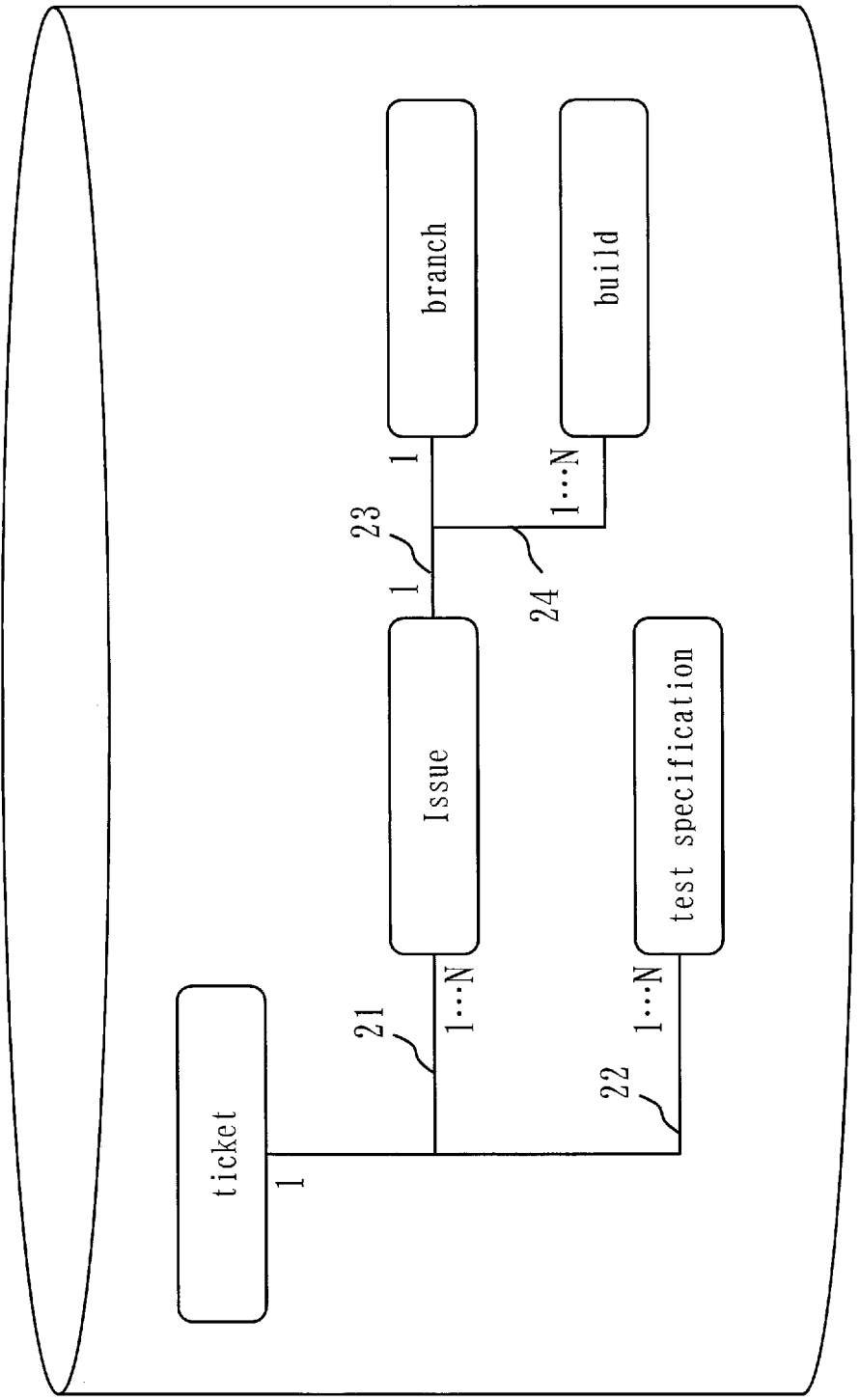
FIG. 3 is a diagram illustrating an example of relation definition information according to Embodiment 1.

An example of the relation definition information 161 according to the present embodiment will be described with referring to FIG. 3.

In step S501a, the link registration unit 110 refers to the relation definition information 161 when performing crawling.

Ticket is an example of development management data managed by the ticket management system 201.

Issue and branch are examples of development management data managed by the version management system 202.

Test specification is an example of development management data managed by the test management system 204.

Build is an example of development management data managed by the build management system 203.

Relation 21 represents a relation between the ticket managed by the ticket management system 201 and the Issue managed by the version management system 202. It is indicated that one ticket corresponds to one Issue or more and N Issues or less where N is a natural number.

Relation 22 represents a relation between the ticket and the test specification managed by the test management system 204. It is indicated that one ticket corresponds to one test specification or more and N test specifications or less.

Relation 23 represents a relation between the Issue and branch managed by the version management system 202. It is indicated that one Issue corresponds to one branch.

Relation 24 represents a relation between the Issue managed by the version management system 202 and the build managed by the build management system 203. It is indicated that one Issue corresponds to one build or more and N builds or less.

An example of the regulation information 163 according to the present embodiment will be described with referring to FIG. 4.

In step S501b, the link registration unit 110 refers to the regulation information 163 when performing crawling.

A relating rule concerning each item of the development management data is recorded in the regulation information 163. In FIG. 4, an arbitrary character string is entered in [name]. Information for distinguishing an upper-level element corresponding to the definition by the relation definition information 161 of FIG. 2 is entered in each of {ticket number} and {Issue number}. An IDentifier (ID) number is entered, as a typical example of the information for distinguishing the upper-level element.

In the column of data type in FIG. 4, a target whose details are to be inquired by the link management device 100 when performing crawling is registered. In the column of data information storage location, which development management system 210 stores the inquiry target data is registered. In the column of information to refer to, information to refer to when inquiring the details is registered. In the column of naming regulation, a naming rule which the information being referred to should follow for the purpose of linking is registered.

Row 401 indicates that Issue is stored in the version management system and can be related to ticket with referring to ticket name recorded in detailed information of the Issue and extracting a ticket number according to a naming regulation.

Row 402 indicates that branch is stored in the build management system and can be related to Issue with referring to branch name recorded in detailed information of the branch and extracting Issue number according to a naming regulation.

Row 403 indicates that build is stored in the build management system and can be related to Issue with referring to branch name recorded in detailed information of the build and extracting Issue number according to a naming regulation.

Row 404 indicates that test specification is stored in the test management system and can be related to ticket with referring to ticket name recorded in detailed information of the test specification and extracting ticket number according to a naming regulation.

In step S502, the link registration unit 110 acquires a crawling result 31 which is a result of crawling using the relation definition information 161 and the regulation information 163. The link registration unit 110 acquires, as the crawling result 31, information of the development management data including the naming information 31b of the development management data.

In step S503, the link registration unit 110 determines whether there is an item of the development management data that violates the relation definition information 161 or the regulation information 163, based on the crawling result 31, the relation definition information 161, and the regulation information 163. If there is a violating item of the development management data, the link registration unit 110 outputs a violation report 32 reporting a violation to the naming regulation of the development management data, to the data correction unit 120.

Following is a specific example of "a flow of determining naming regulation violation of data whose data type is Issue".

(1) The regulation information 163 defines that Issue is stored in the version management system and ticket name in the detailed information of Issue should be referred to. Hence, the link registration unit 110 refers to ticket name as the naming information 31b by crawling.

(2) The link registration unit 110 checks by pattern matching whether there is no difference in format between ticket name and the naming regulation defined by the regulation information 163.

(3) If there is a difference, the link registration unit 110 regards this as a violation to the naming regulation and outputs a violation report 32 to the data correction unit 120.

(4) If there is no difference, the link registration unit 110 checks, using the relation definition information 161, whether the relation between items of the development management data which are related by the naming regulation conforms to the definition.

(5) In a specific example, a relation between Issue and branch is not a 1:1 relation and thus does not conform to the definition defined by the relation definition information 161. If the definition does not apply as in this case, the link registration unit 110 regards this as a violation to the regulation and outputs a violation report 32 to the data correction unit 120.

In step S504, the link registration unit 110 performs link registration with the development management system 210 in the tool chain system 200, using the naming information 31b of the development management data which is acquired by crawling.

The processing mentioned above will be described with referring to a specific example.

For example, the link registration unit 110 refers to the regulation information 163. If the data type is Issue data, the link registration unit 110 acquires, as the naming information 31b, a name which is a ticket name recorded in details of the Issue data registered in the version management system. After that, the link registration unit 110 extracts ticket number from the ticket name naming regulation and links the ticket name to ticket by referring to the ticket number.

When linking is performed in the link registration unit 110 with referring to naming regulation information, new relation information such as "certain ticket A to Issue is 1:3 correspondence" is obtained. At the same time, the link record information 162 is referred to for the ticket A, and existing relation information "ticket A to linked Issue is 1:5 correspondence" is acquired. The link registration unit 110 adds up the two, the new relation information and the existing information. If 1:8 is not allowed by the relation definition information 161, the link registration unit 110 reports a violation.

An example of a link registration result according to the present embodiment will be described with referring to FIG. 5.

A link is added in the form of a Uniform Resource Location (URL) link to the detailed information of development management data to enable related items of data to refer to each other.

Development management data 601 is an example of a case where ticket managed by the ticket management system is referred to by a Web browser. As a result of link registration, a URL link to Issue corresponding to the ticket and a URL link to test specification are added.

Development management data 602 is an example of a case where test specification managed by the test management system is referred to by the Web browser. As a result of link registration, a URL link to ticket corresponding to the test specification is added.

Development management data 603 is an example of a case where Issue managed by the version management system is referred to by the Web browser. As a result of link registration, a URL link to ticket corresponding to the Issue is added.

In step S505, the link registration unit 110 records information of the link registered in step S504 to the link record information 162.

An example of the link record information 162 according to the present embodiment will be described with referring to FIG. 6.

Figure 6:
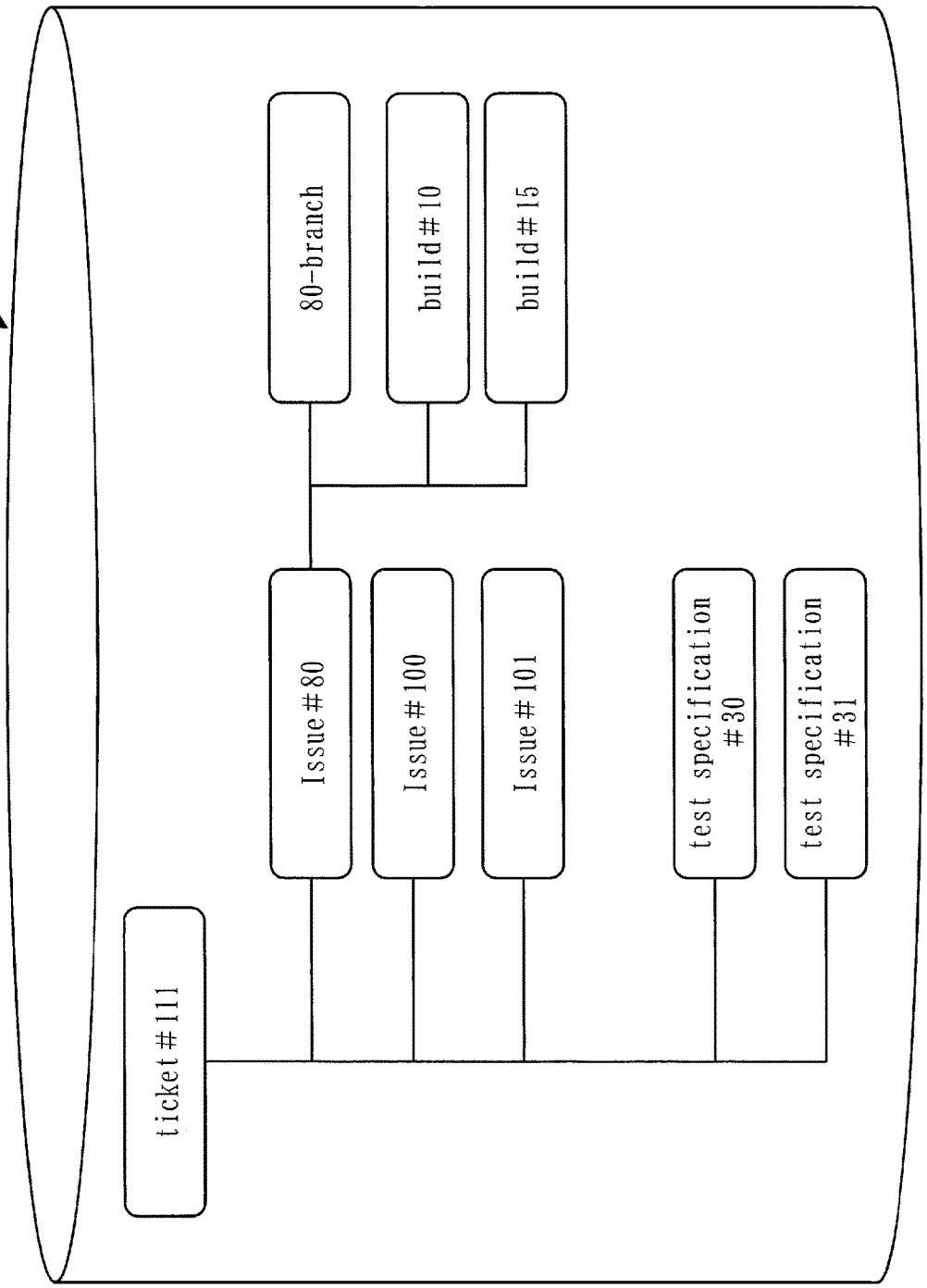
FIG. 6 is a diagram illustrating an example of link record information according to Embodiment 1.

In the example of the link record information 162 of FIG. 6, a result is recorded that a plurality of Issues and a plurality of test specifications are linked to ticket #111. Also, a result is recorded that one branch and a plurality of builds are linked to Issue #80. By recording links to the database in this manner, a response to an inquiry for a linking result can be obtained at a high speed.

<Data Correction Process S120>

Figure 7:
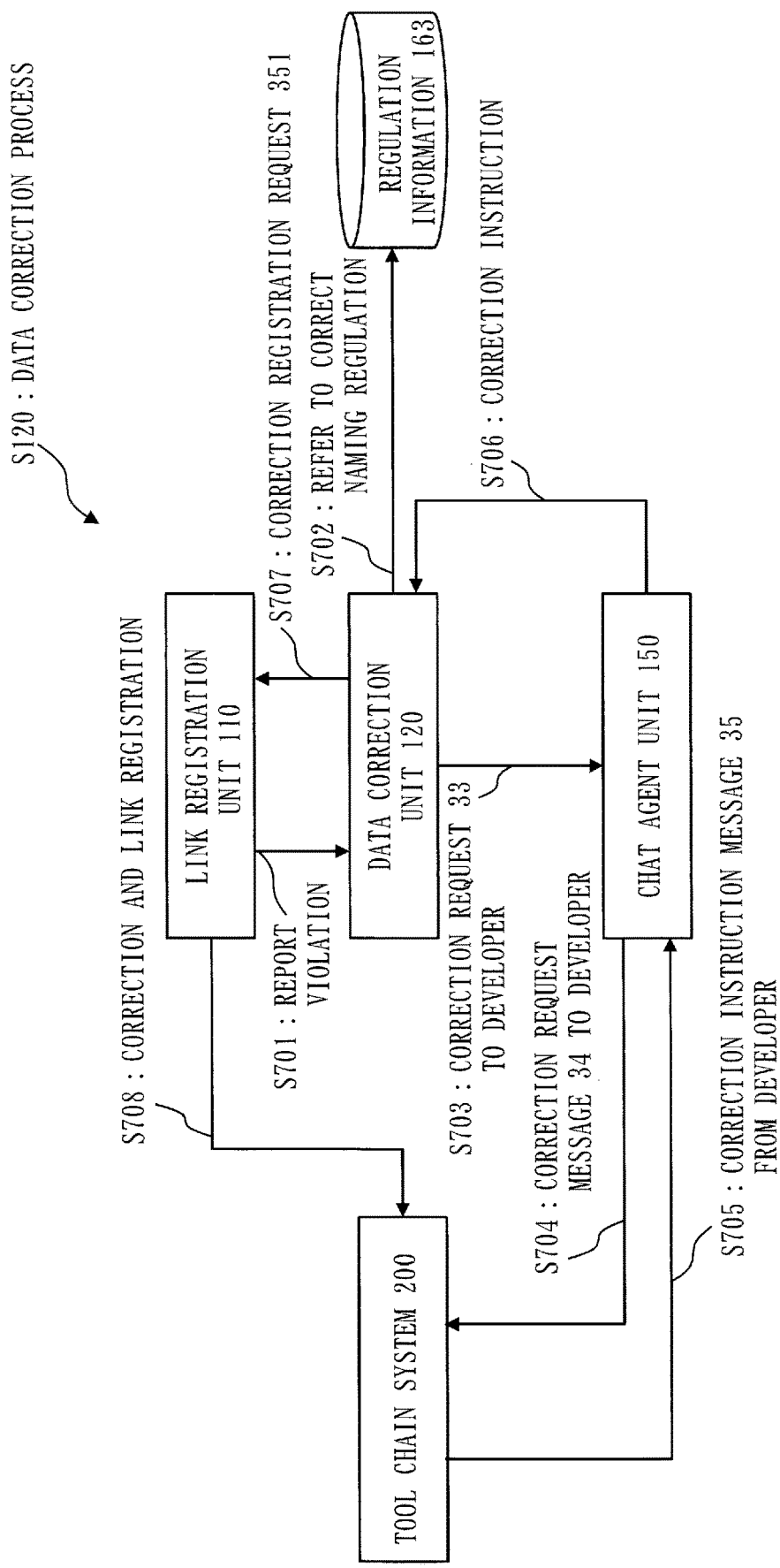
FIG. 7 is a diagram illustrating a data correction process according to Embodiment 1.

Data correction process S120 according to the present embodiment will be described with referring to FIG. 7.

In data correction process S120, in response to the violation report 32 received from the link registration unit 110, the data correction unit 120 exchanges messages with the developer and carries out correction.

In step S701, the data correction unit 120 receives from the link registration unit 110 the violation report 32 reporting a violation to the naming regulation of the development management data.

In step S702, the data correction unit 120 refers to the regulation information 163 to check a correct naming rule and generates correction assist information.

In step S703, for the chat agent unit 150, the data correction unit 120 generates a correction request 33 to the developer. The correction request 33 includes information of the regulation-violating development management data reported in step S701 and the correction assist information generated in step S702.

In step S704, the chat agent unit 150 transmits the correction request message 34 including the correction request 33 received from the data correction unit 120, to the tool chain system 200 using the chat. Specifically, the chat agent unit 150 generates the correction request message 34 to the developer, from the correction information included in the correction request 33 sent from the data correction unit 120. Then, the chat agent unit 150 transmits the correction request message 34 to the development chat system 205 in the tool chain system 200.

Figure 8:
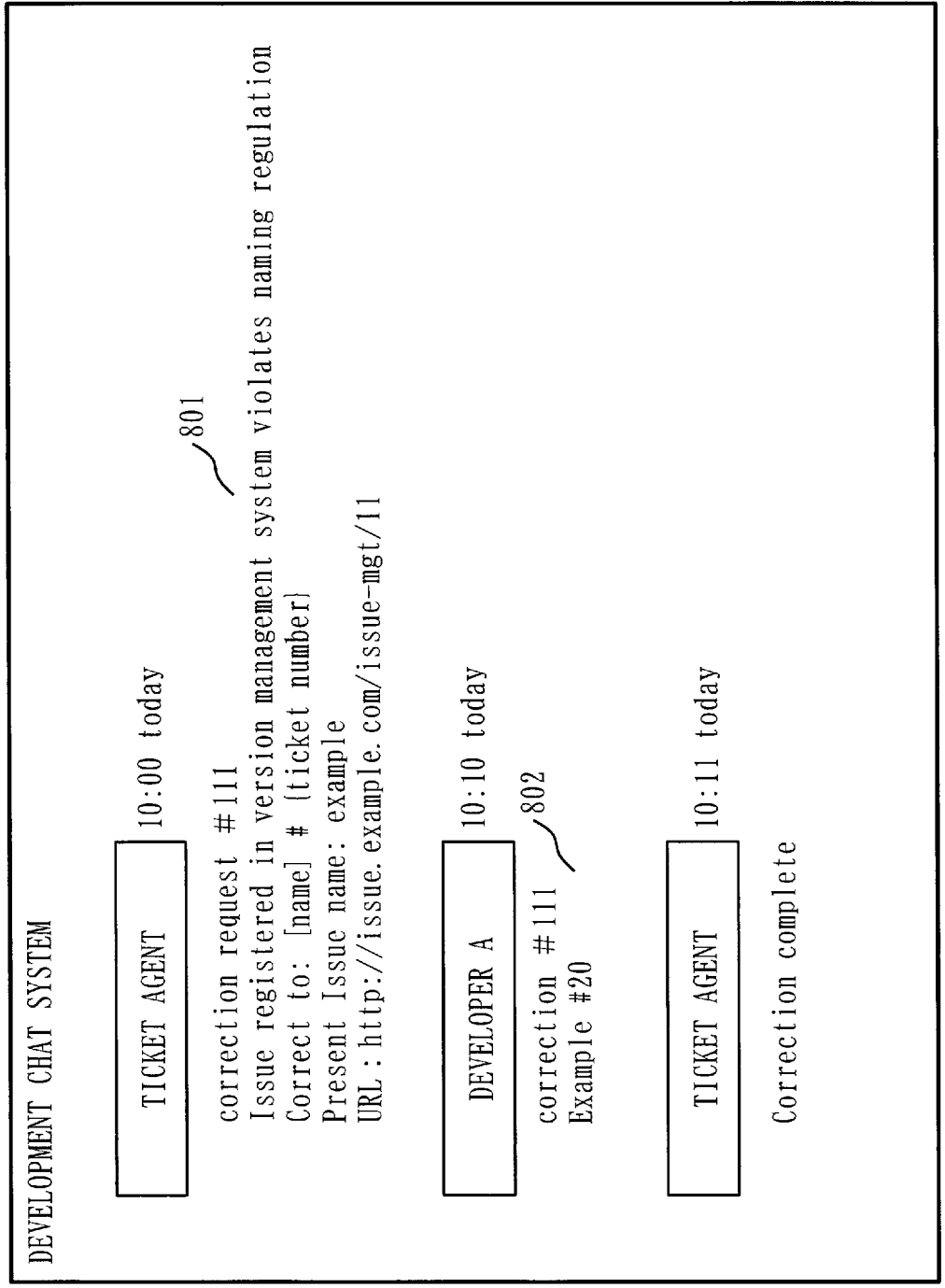
FIG. 8 illustrates an example of message exchange by chatting in the data correction process according to Embodiment 1.

An example of message exchange using the chat in the data correction process according to the present embodiment will be described with referring to FIG. 8.

A message 801 is an example of the correction request message 34 sent from the chat agent unit 150 to the developer. The message 801 indicates on the 1st line that this message is a correction request message 34, together with a correction request ID (Identifier). The message 801 also indicates the information of the item of the development management data violating the naming regulation, and how to correct the data.

In step S705, the chat agent unit 150, having received the correction instruction message 35 from the developer, determines from a message content that this message concerns correction, and extracts a correction instruction.

A message 802 is an example of the correction instruction message 35 sent from the developer to the chat agent unit 150. The message 802 indicates on the 1st line which correction request this correction responds to, and indicates on the following line a name of corrected development management data.

In step S706, the chat agent unit 150 outputs to the data correction unit 120 the correction instruction message 35 received from the tool chain system 200 using a chat. Specifically, the chat agent unit 150 transmits the correction instruction received from the developer and included in the correction instruction message 35, to the data correction unit 120.

In step S707, the data correction unit 120 outputs a correction request to the link registration unit 110, based on the correction instruction from the developer.

In step S708, the link registration unit 110 corrects the name of the item of the development management data violating the naming regulation, and then performs link registration again.

<Inquiry Process S130>

Figure 9:
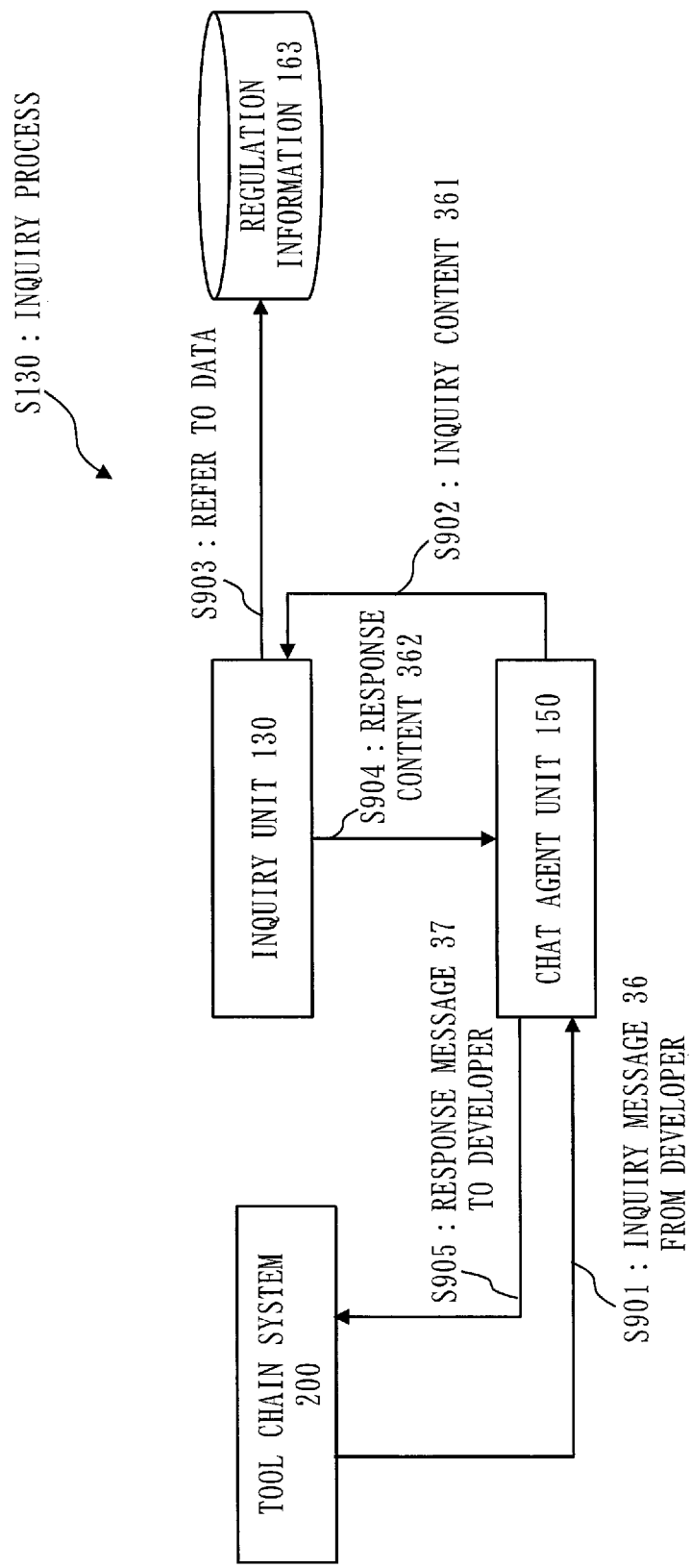
FIG. 9 is a diagram illustrating an inquiry process according to Embodiment 1.

Inquiry process S130 according to the present embodiment will be described with referring to FIG. 9.

In inquiry process S130, the inquiry unit 130 replies to the inquiry from the developer about development management data, with link information of a related item of the development management data.

In step S901, the chat agent unit 150 receives an inquiry message 36 about a link between the items of the development management data, from the tool chain system 200 using the chat. Then, the chat agent unit 150 outputs an inquiry content 361 included in the inquiry message 36. Specifically, the chat agent unit 150 receives the inquiry message 36 from the developer. From a content of the inquiry message 36, the chat agent unit 150 determines that this message concerns an inquiry, and extracts the inquiry content 361.

Figure 10:
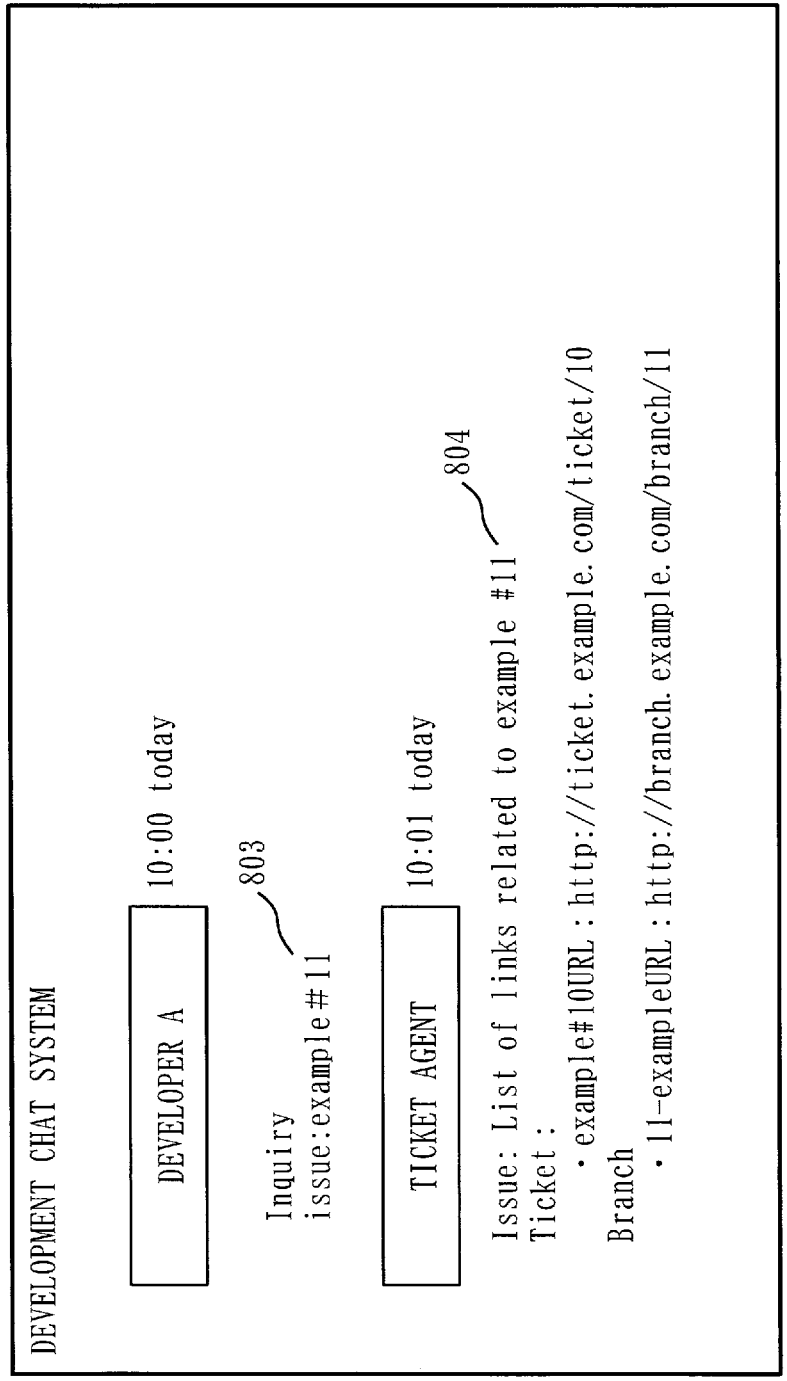
FIG. 10 illustrates an example of message exchange by chatting in the inquiry process according to Embodiment 1.

An example of message exchange using the chat in the inquiry process according to the present embodiment will be described with referring to FIG. 10.

A message 803 is an example of the inquiry message 36 from the developer to a chat agent. The message 803 indicates on the 1st line that this is an inquiry message 36, and indicates on the following line a name of an item of the development management data from which link information is to be inquired.

In step S902, the chat agent unit 150 transmits the inquiry content 361 to the inquiry unit 130.

In step S903, the inquiry unit 130 receives the inquiry content 361 from the chat agent unit 150. Based on the link record information 162, the inquiry unit 130 outputs a response content 362 for the inquiry content 361 to the chat agent unit 150. Specifically, the inquiry unit 130 refers to the link record information 162 for the link information, based on the inquiry content 361.

In step S904, the inquiry unit 130 transmits link information of the item of the development management data corresponding to the inquiry content 361, to the chat agent unit 150 as a reply.

In step S905, the chat agent unit 150 generates a response message 37 for the developer, from the reply content received from the inquiry unit 130. Then, the chat agent unit 150 transmits the response message 37 including the response content 362 to the tool chain system 200, using the chat. In short, the chat agent unit 150 transmits the response message 37 to the development chat system 205 in the tool chain system 200.

A message 804 is an example of the response message 37 from the chat agent unit 150 to the developer. The message 804 indicates on the 1st line that this is a reply informing of the link information concerning the item of the development management data being inquired from, and indicates, from the following line, a list of the link information.

<Setting Process S140>

Figure 11:
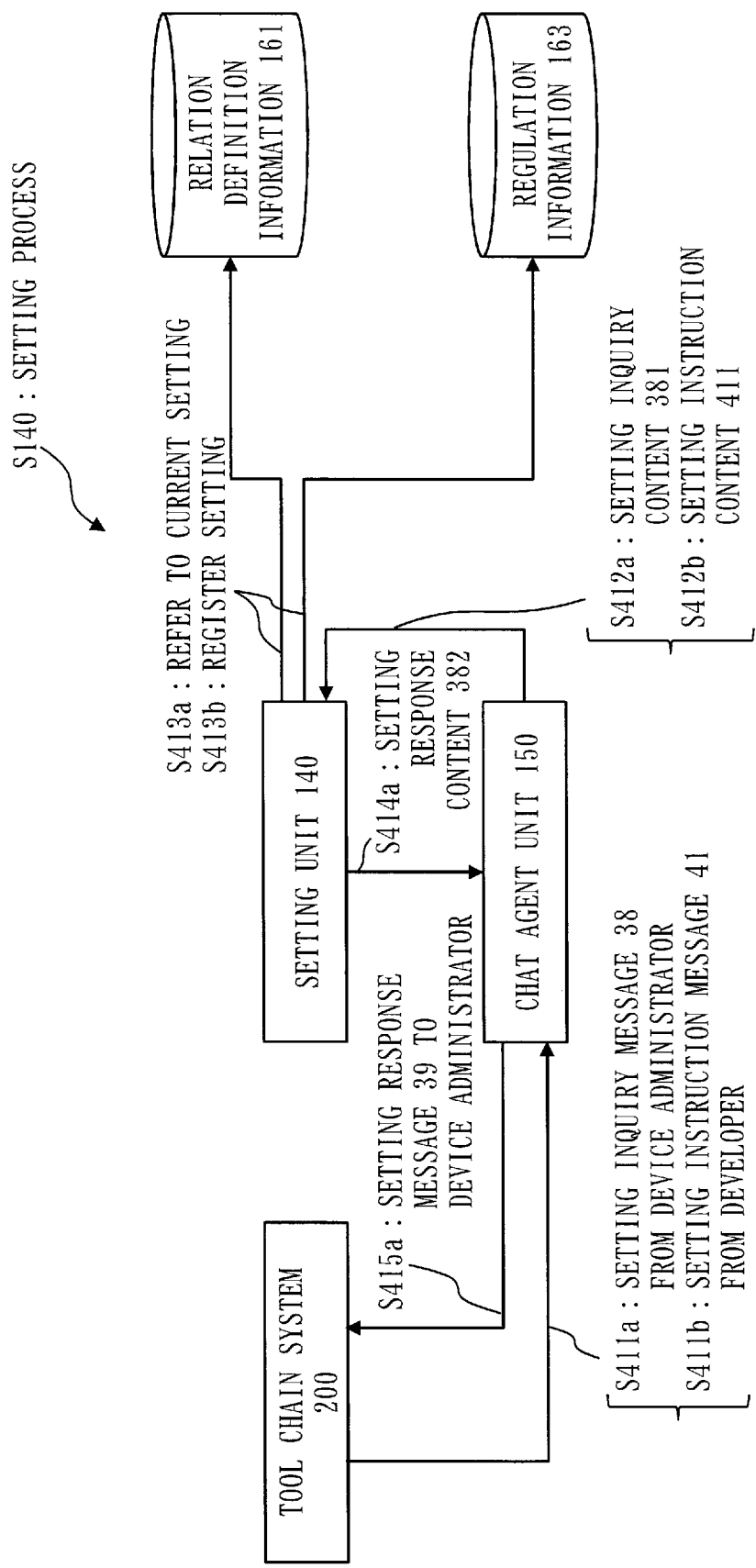
FIG. 11 is a diagram illustrating a setting process according to Embodiment 1.

Setting process S140 according to the present embodiment will be described with referring to FIG. 11.

Setting process S140 consists of two processes, namely, inquiry about current setting and change of device setting due to database update. In setting process S140, the setting unit 140 transmits a setting response message 39 for a setting inquiry message 38 received from the device administrator of the link management device 100. In step S140, the setting unit 140 also updates the relation definition information 161 and the regulation information 163, using a setting instruction message 41 received from the device administrator of the link management device 100.

In step S411a, the chat agent unit 150 receives the setting inquiry message 38 inquiring the current setting of the relation definition information 161 or of the regulation information 163, from the tool chain system 200 using the chat. The chat agent unit 150 outputs a setting inquiry content 381 included in the setting inquiry message 38. Specifically, the chat agent unit 150, having received the setting inquiry message 38 from the device administrator, determines from the content of the message that this inquires the current setting, and extracts the setting inquiry content 381.

In step S412a, the chat agent unit 150 transmits the setting inquiry content 381 to the setting unit 140.

In step S413a, the setting unit 140 receives the setting inquiry content 381 from the chat agent unit 150. Based on the relation definition information 161 or the regulation information 163, the setting unit 140 generates a setting response content 382 for the setting inquiry content 381. The setting unit 140 acquires information corresponding to the setting inquiry content 381 by referring to the relation definition information 161 and the regulation information 163.

In step S414a, the setting unit 140 outputs the setting response content 382 to the chat agent unit 150.

In step S415a, the chat agent unit 150 transmits a setting response message 39 including the setting response content 382 to the tool chain system 200, using the chat. Specifically, the chat agent unit 150 generates the setting response message 39 for the device administrator, from the setting response content 382 received from the setting unit 140. Then, the chat agent unit 150 transmits the setting response message 39 to the development chat system 205 in the tool chain system 200.

An example of message exchange using the chat in the setting process according to the present embodiment will be described with referring to FIG. 12.

Figure 12:
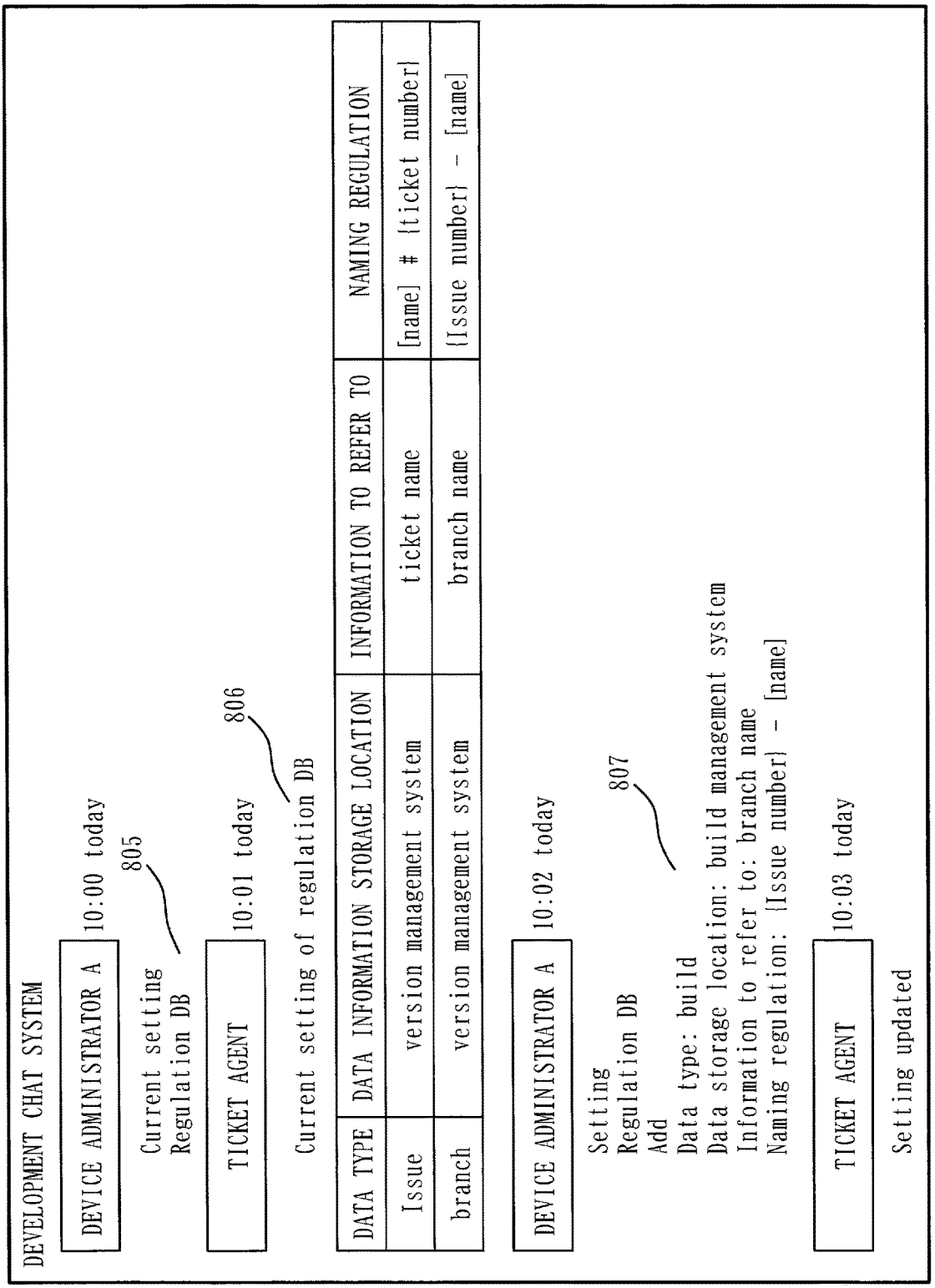
FIG. 12 illustrates an example of message exchange by chatting in the setting process according to Embodiment 1.

In FIG. 12, a message 805 is an example of the setting inquiry message 38 from the device administrator to the chat agent unit 150. The message 805 indicates on the 1st line that this is a setting inquiry message 38, and indicates on the following line a name of a database that has setting information to be inquired.

In FIG. 12, a message 806 is an example of the setting response message 39 from the chat agent unit 150 to the device administrator. The message 806 indicates on the 1st line that this is a setting response message 39, and indicates, from the following line, the current setting.

In step S411b, the chat agent unit 150 receives the setting instruction message 41 instructing update of the relation definition information 161 or of the regulation information 163, from the tool chain system 200 using the chat. The chat agent unit 150 outputs the setting instruction content 411 included in the setting instruction message 41. Specifically, the chat agent unit 150 receives the setting instruction message 41 from the device administrator, determines from a content of the message that this is a setting instruction message 41, and extracts a setting content designated by the device administrator.

In FIG. 12, a message 807 is an example of the setting instruction message 41 from the device administrator to the chat agent unit 150. The message 807 indicates on the 1st line that this is a setting instruction message 41, and indicates on the 2nd and 3rd lines to execute what process on which database. Furthermore, the message 807 indicates, from the 4th line, the setting content.

In step S412b, the chat agent unit 150 transmits a setting instruction content 411 to the setting unit 140.

In step S413b, the setting unit 140 receives the setting instruction content 411 from the chat agent unit 150. Then, the setting unit 140 executes update of the relation definition information 161 or the regulation information 163 according to the setting instruction content 411. That is, the setting unit 140 extracts, from the setting instruction content 411 received in step S412b, a corresponding portion and a setting content of the relation definition information 161 or the regulation information 163, and updates the relation definition information 161 or the regulation information 163 according to the setting instruction content 411.

*Other Configurations*

<Modification 1>

In the present embodiment, the functions of the link registration unit 110, data correction unit 120, inquiry unit 130, setting unit 140, and chat agent unit 150 are implemented by software. In a modification, the functions of the link registration unit 110, data correction unit 120, inquiry unit 130, setting unit 140, and chat agent unit 150 may be implemented by hardware.

Figure 13:
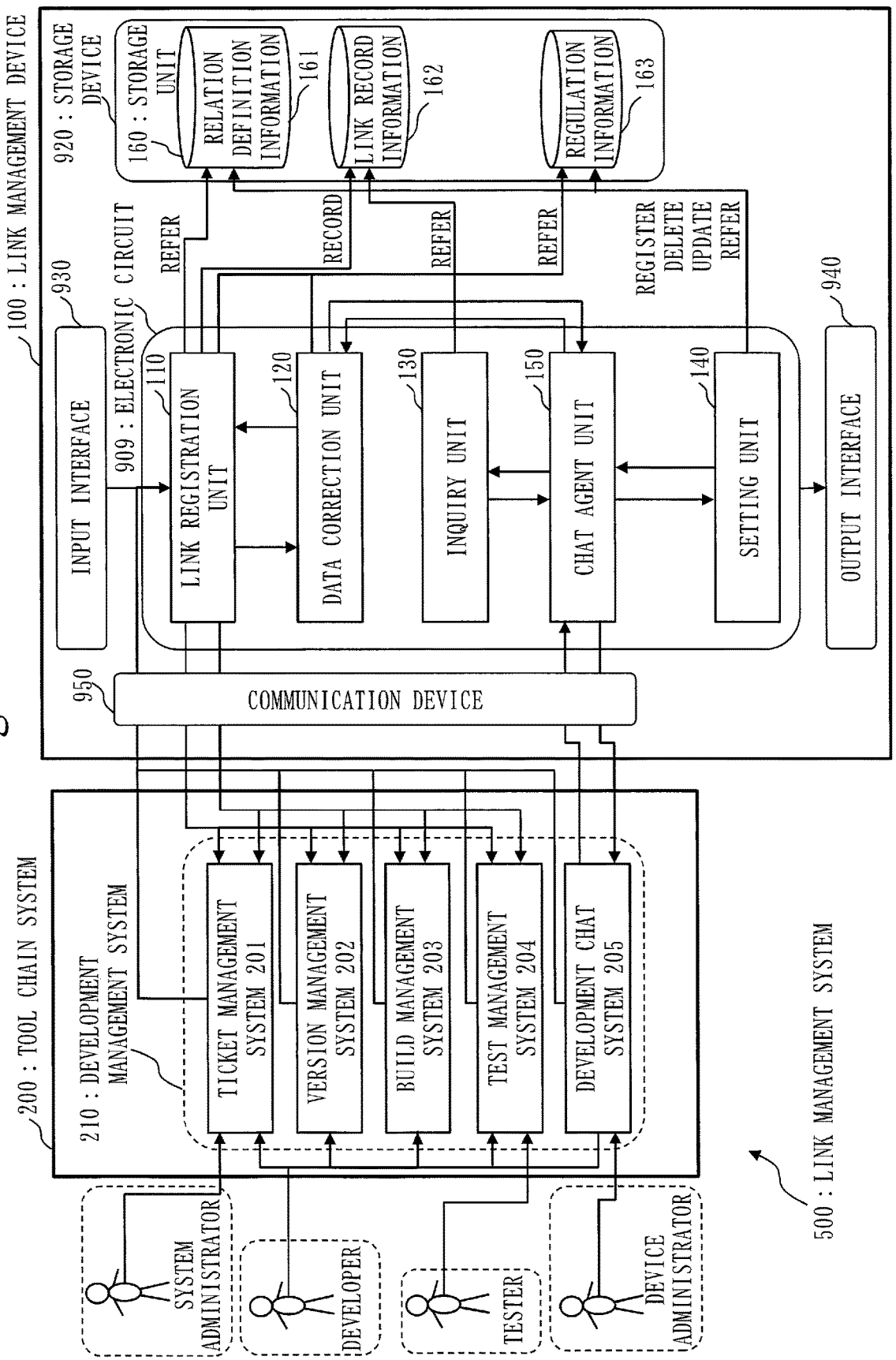
FIG. 13 is a configuration diagram of a link management device according to a modification of Embodiment 1.

FIG. 13 is a diagram illustrating a configuration of a link management device 100 according to a modification of the present embodiment.

The link management device 100 is provided with an electronic circuit 909, a storage device 920, an input interface 930, an output interface 940, and a communication device 950.

The electronic circuit 909 is a dedicated electronic circuit that implements the functions of the link registration unit 110, data correction unit 120, inquiry unit 130, setting unit 140, and chat agent unit 150.

The electronic circuit 909 is specifically a single circuit, a composite circuit, a programmed processor, a parallel-programmed processor, a logic IC, a GA, an ASIC, or an FPGA. Note that GA stands for Gate Array, ASIC stands for Application Specific Integrated Circuit, and FPGA stands for Field-Programmable Gate Array.

The functions of the link registration unit 110, data correction unit 120, inquiry unit 130, setting unit 140, and chat agent unit 150 may be implemented by one electronic circuit, or may be implemented by a plurality of electronic circuits through distribution.

In another modification, some of the functions of the link registration unit 110, data correction unit 120, inquiry unit 130, setting unit 140, and chat agent unit 150 may be implemented by an electronic circuit, and the remaining functions may be implemented by software.

The processor and the electronic circuit are called processing circuitry as well. In other words, in the link management device 100, the functions of the link registration unit 110, data correction unit 120, inquiry unit 130, setting unit 140, and chat agent unit 150 are implemented by processing circuitry.

In the link management device 100, "unit" in each of the link registration unit, the data correction unit, the inquiry unit, the setting unit, and the chat agent unit may be replaced by "stage" or "procedure". Also, "process" in each of the link registration process, the data correction process, the inquiry process, the setting process, and the chat agent process may be replaced by "program", "program product", or "computer readable storage medium recorded with a program".

\*\*\*Description of Effect of Present Embodiment\*\*\*

The link management device 100 according to the present embodiment has a relation definition database which records a relationship between items of the development management data of the development management systems, and can register a link between related items of the development management data automatically. Hence, the link management device 100 according to the present embodiment is effective in aiding a user of the development management system.

The link management device 100 according to the present embodiment has a link record database which records a linking result of the items of the development management data by the link registration unit. Hence, with the link management device 100 according to the present embodiment, a response to an inquiry for a linking result can be obtained at a high speed.

The link management device 100 according to the present embodiment has a regulation database which records definition of a naming rule of each item of the development management data. Hence, the link management device 100 according to the present embodiment can analyze a data name automatically from the naming rule, and if a naming rule violation is detected, can send a violation notice to the developer.

The link management device 100 according to the present embodiment performs crawling of the tool chain system as a target. Hence, coordination of all items of the development management data including existing data held by each development management system can be realized by link registration. Also, as the link management device 100 according to the present embodiment regularly performs crawling of the tool chain system as a target, accurate link registration can be performed.

Normally, a link management system uses a graphical user interface (GUI) as the interface. This consequently increases by one a number of monitors utilized in usual development, incurring a learning cost for GUI operations. In contrast to this, the link management device 100 according to the present embodiment uses a development chat system, being part of the tool chain system, as an interface. Therefore, the link management device 100 according to the present embodiment realizes interactive operations and facilitates introduction and use of a device aiming at coordination of development management systems.

In the present embodiment, each unit of the link management device is described as an independent function block. However, the link management device does not necessarily have a configuration like the configuration of the embodiment described above. The function blocks of the link management device may form any configuration as far as they can implement the functions described in the above embodiment.

A plurality of portions of the present embodiment may be practiced in combination. Alternatively, one portion of the present embodiment may be practiced. Also, the present embodiment may be practiced in any combination entirely or partly.

The embodiment described above is an essentially preferable exemplification and is not intended to limit the scope of the present invention, the scope of the applied product of the present invention, and the scope of the application of the present invention. Various changes can be made to the above embodiment as necessary.

REFERENCE SIGNS LIST 21, 22, 23, 24: relation; 31: crawling result; 31b: naming information; 311: link registration instruction; 32: violation report; 33: correction request; 34: correction request message; 35: correction instruction message; 351: correction registration request; 36: inquiry message; 361: inquiry content; 362: response content; 37: response message; 38: setting inquiry message; 381: setting inquiry content; 382: setting response content; 39: setting response message; 41: setting instruction message; 411: setting instruction content; 100: link management device; 110: link registration unit; 120: data correction unit; 130: inquiry unit; 140: setting unit; 150: chat agent unit; 160: storage unit; 161: relation definition information; 162: link record information; 163: regulation information; 200: tool chain system; 210: development management system; 201: ticket management system; 202: version management system; 203: build management system; 204: test management system; 205: development chat system; 401, 402, 403, 404: row; 500: link management system; 601, 602, 603: development management data; 801, 802, 803, 804, 805, 807, 806: message; 909: electronic circuit; 910: processor; 920: storage device; 930: input interface; 940: output interface; 950: communication device; S100: link management process.

The invention claimed is:

1. A link management device which, concerning development management data utilized by each of a plurality of development management systems included in a tool chain system, manages a link between items of the development management data, the link management device comprising processing circuitry to acquire, from each of the plurality of development management systems, information of the development management data including naming information indicating naming of the development management data, to transmit, based on the information of the development management data, a link registration instruction for registering the link between the items of the development management data to the plurality of development management systems, and to record the link between the items of the development management data, as link record information.

2. The link management device according to claim 1, wherein based on relation definition information indicating a condition between the items of the development management data, regulation information including a naming condition of the development management data, and information of the development management data, the processing circuitry determines whether there is an item of development management data that violates the relation definition information or the regulation information, and if there is a violating item of the development management data, outputs a violation report, and wherein based on the violation report, the processing circuitry transmits a correction request message for correcting the violating item of the development management data, to the tool chain system, and upon reception of a correction instruction message including a correction instruction that corrects the violating item of the development management data, outputs a correction registration request for registering the link to the corrected item of the development management data.

3. The link management device according to claim 2, wherein the processing circuitry communicates with the tool chain system using a chat, and transmits the correction instruction message received from the tool chain system, to the tool chain system using the chat, and outputs the correction instruction message received from the tool chain system using the chat.

4. The link management device according to claim 3, wherein the processing circuitry receives an inquiry message about a link between the items of the development management data, from the tool chain system using the chat, and outputs an inquiry content included in the inquiry message, receives the inquiry content, and based on the link record information, outputs a response content for the inquiry content, and transmits a response message including the response content to the tool chain system, using the chat.

5. The link management device according to claim 3, wherein the processing circuitry receives a setting instruction message instructing update of the relation definition information or of the regulation information, from the tool chain system using the chat, and outputs a setting instruction content included in the setting instruction message, and receives the setting instruction content, and executes update of the relation definition information or the regulation information according to the setting instruction content.

6. The link management device according to claim 4, wherein the processing circuitry receives a setting instruction message instructing update of the relation definition information or of the regulation information, from the tool chain system using the chat, and outputs a setting instruction content included in the setting instruction message, and receives the setting instruction content, and executes update of the relation definition information or the regulation information according to the setting instruction content.

7. The link management device according to claim 5, wherein the processing circuitry receives a setting inquiry message inquiring a current setting of the relation definition information or of the regulation information, from the tool chain system using the chat, and outputs a setting inquiry content included in the setting inquiry message, receives the setting inquiry content, generates, based on the relation definition information or the regulation information, a setting response content for the setting inquiry content, and outputs the setting response content, and transmits a setting response message including the setting response content to the tool chain system, using the chat.

8. The link management device according to claim 6, wherein the processing circuitry receives a setting inquiry message inquiring a current setting of the relation definition information or of the regulation information, from the tool chain system using the chat, and outputs a setting inquiry content included in the setting inquiry message, receives the setting inquiry content, generates, based on the relation definition information or the regulation information, a setting response content for the setting inquiry content, and outputs the setting response content, and transmits a setting response message including the setting response content to the tool chain system, using the chat.

9. A link management method of a link management device which, concerning development management data utilized by each of a plurality of development management systems included in a tool chain system, manages a link between items of the development management data, the link management method comprising acquiring, from each of the plurality of development management systems, information of the development management data including naming information indicating naming of the development management data, and transmitting, based on the information of the development management data, a link registration instruction for registering the link between the items of the development management data to the plurality of development management systems, and recording the link between the items of the development management data, as link record information.

10. A non-transitory computer readable medium recorded with a link management program of a link management device being a computer which, concerning development management data utilized by each of a plurality of development management systems included in a tool chain system, manages a link between items of the development management data, the link management program causing the link management device to execute a link registration process of acquiring, from each of the plurality of development management systems, information of the development management data including naming information indicating naming of the development management data, transmitting, based on the information of the development management data, a link registration instruction for registering the link between the items of the development management data to the plurality of development management systems, and recording the link between the items of the development management data, as link record information.

* * * * *